United States Patent
Jarrett et al.

(10) Patent No.: US 11,036,453 B1
(45) Date of Patent: Jun. 15, 2021

(54) BEZEL EMBEDDED HEAD TRACKING FIDUCIALS

(71) Applicant: Rockwell Collins, Inc., Cedar Rapids, IA (US)

(72) Inventors: Andrew M. Jarrett, Cedar Rapids, IA (US); Michael A. Ropers, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/665,966

(22) Filed: Oct. 28, 2019

(51) Int. Cl.
| | |
|---|---|
| *G06K 9/20* | (2006.01) |
| *G06F 3/14* | (2006.01) |
| *G06T 7/73* | (2017.01) |
| *G06K 7/14* | (2006.01) |
| *G06K 19/06* | (2006.01) |
| *G06F 3/01* | (2006.01) |

(52) U.S. Cl.
CPC ............ *G06F 3/1423* (2013.01); *G06F 3/012* (2013.01); *G06K 7/1417* (2013.01); *G06K 9/2054* (2013.01); *G06K 19/06037* (2013.01); *G06T 7/73* (2017.01); *G06T 2207/30204* (2013.01)

(58) Field of Classification Search
CPC .............. G06K 9/2054; G06K 7/1417; G06K 19/06037; G06F 3/012; G06F 3/1423; G06T 7/73; G06T 2207/30204
See application file for complete search history.

(56) References Cited

U.S. PATENT DOCUMENTS

| | | | |
|---|---|---|---|
| 9,874,931 B1 | 1/2018 | Koenck et al. | |
| 9,891,705 B1* | 2/2018 | Lahr | G06K 9/2054 |
| 2010/0295754 A1 | 11/2010 | Cernasov et al. | |
| 2016/0339337 A1 | 11/2016 | Ellsworth et al. | |
| 2018/0275755 A1* | 9/2018 | Massonneau | G06F 3/012 |

OTHER PUBLICATIONS

Search Report for European Application No. 20204399.8 dated Mar. 26, 2021, 9 pages.

* cited by examiner

*Primary Examiner* — Abdul-Samad A Adediran
(74) *Attorney, Agent, or Firm* — Suiter Swantz pc llo

(57) ABSTRACT

A device and method for presentation of bezel embedded head tracking fiducials within an aircraft cockpit incorporates two and three-dimensional fiducial markers within a bezel of a forward display. Oriented in a constellation within a constant field of view of the pilot, the fiducials are specifically configured for continuous recognition by an optical sensor associated with a head worn display (HWD). With continuous constellation recognition, the HWD identifies the bezel embedded fiducials and determines a high integrity pose solution of a head reference frame relative to the aircraft enabling the system to present a high integrity primary flight display to the pilot without requiring an additional flight display available. Using active backlit short-wave infrared (SWIR) lighting and/or passively coated with reflective material specifically tuned to the night vision systems available to the HWD sensor, the bezel embedded fiducials allow operation of the HWD systems in any illumination environment.

14 Claims, 6 Drawing Sheets

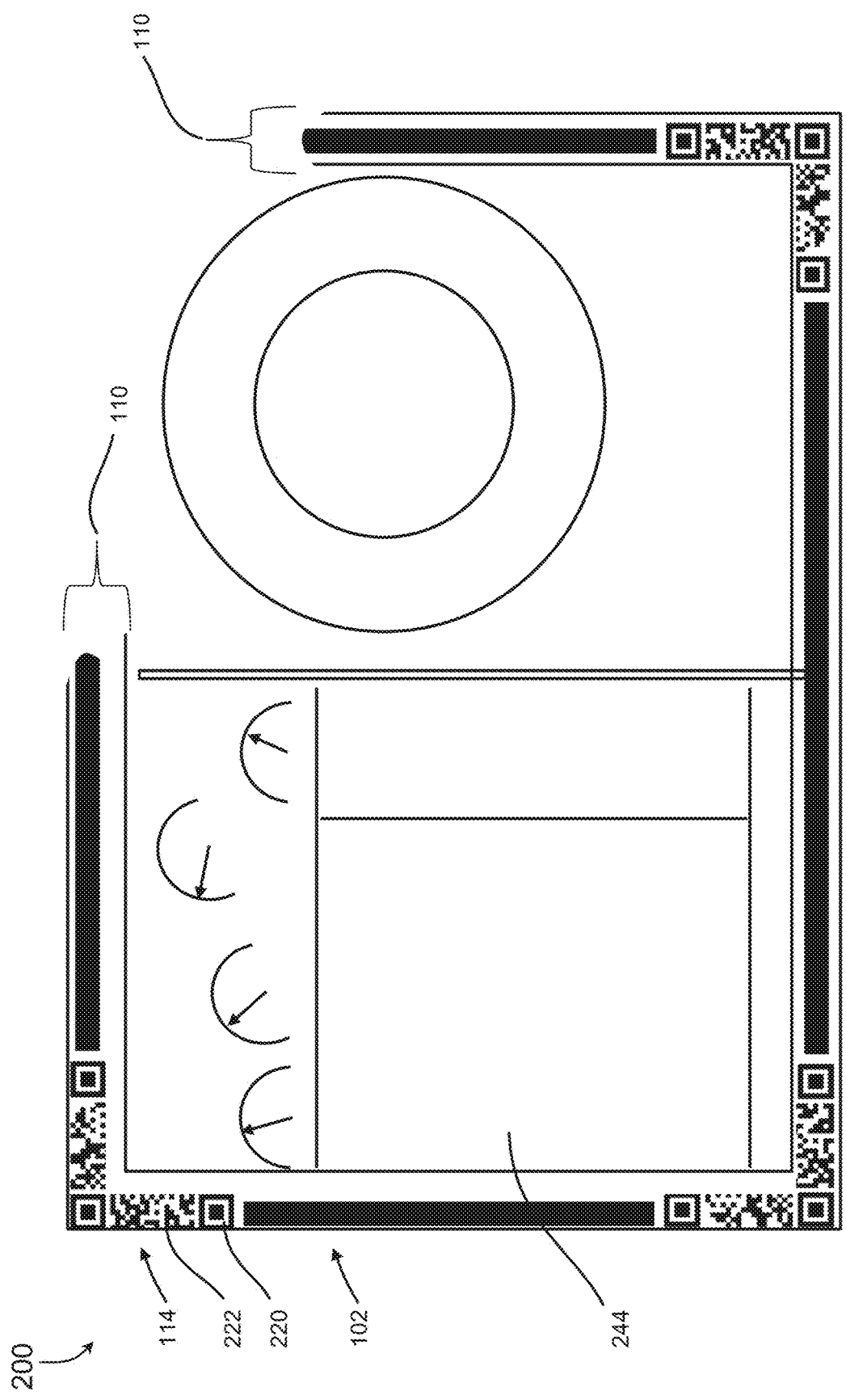

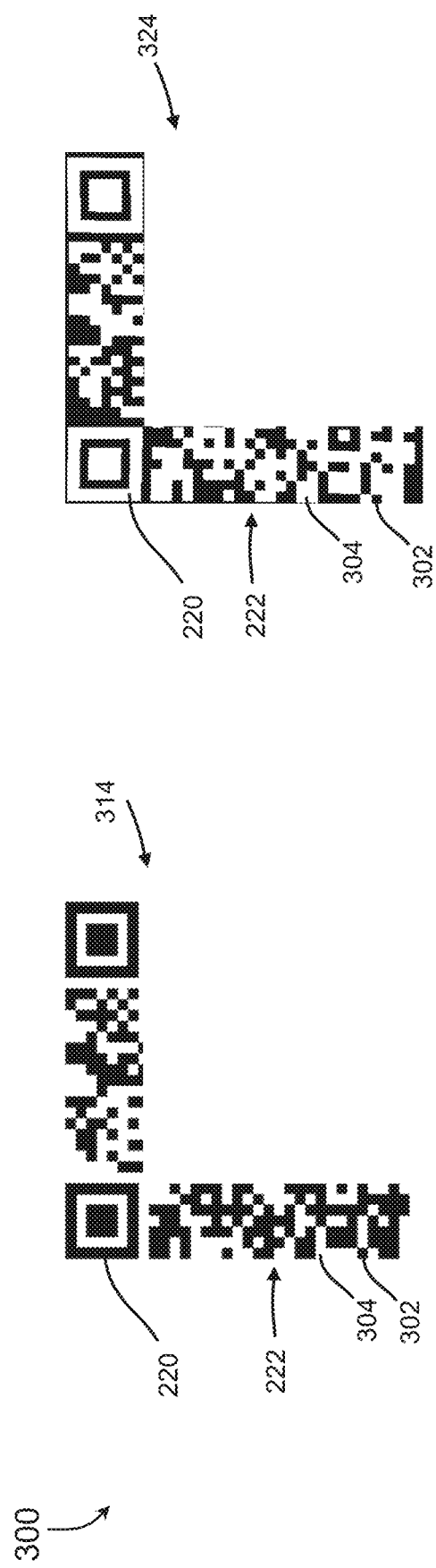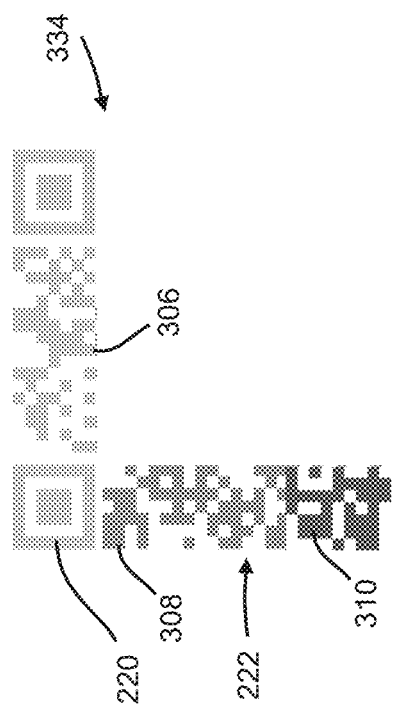
FIG. 3A
FIG. 3B
FIG. 3C

BEZEL EMBEDDED HEAD TRACKING FIDUCIALS

CROSS-REFERENCE TO RELATED APPLICATIONS

The present application is related to U.S. patent application Ser. No. 16/263,388 entitled "High-Integrity Optical Pose Estimation Using Coded Features" filed Jan. 31, 2019, which incorporated herein by reference.

BACKGROUND

For display of an accurately aligned presentation on a Head-worn display (HWD) or Helmet Mounted Display (HMD), the HWD must properly convert flight guidance cues into the head reference frame to allow pilot to virtually and accurately "see" a displayed presentation. In order for the HWD to accurately present the guidance cues, the HWD must be aligned to determine a head pose to display the information in the accurate position on the HWD. If an inaccurate head pose is used to convert safety-critical data in the head frame, Hazardously Misleading Information (HMI) may result causing a display of inaccurate information and leading to a safety risk.

Traditional optical-inertial head trackers may use a peel-and-stick fiducial marker to enable a head mounted sensor to sense the fiducial and align the HWD. Placement of these fiducial markers (e.g., stickers) clutters the cockpit and complicates helmet mounted display integration. Further, these peel-and-stick fiducial markers are limited in use since they are passive (reflective) only and may have operational limitations at low light levels.

Depending on cockpit configuration density, the peel and stick fiducials may be difficult to place in such a way that the head sensor has an unobstructed line of sight to a sufficient number of fiducials. Further, add on fiducials placed on a canopy surface may inhibit vision through that azimuth.

Therefore, a need remains for a device and system which may overcome these limitations and provide a novel solution to leverage existing space surrounding a cockpit display to enable accurate head tracking relative to the aircraft without the integration complexity added by requiring separate fiducial markers.

SUMMARY

In one aspect, embodiments of the inventive concepts disclosed herein are directed to a device for presentation of a bezel embedded head tracking fiducial. The device may comprise a display within an aircraft cockpit onboard an aircraft, the display may include a bezel surrounding the display. Embedded within the bezel, a bezel embedded head tracking fiducial incorporates a coded feature and may be configured for recognition by an optical tracker associated with a head worn display (HWD) system worn by a pilot.

The bezel embedded head tracking fiducial may be combined with others and oriented in a constellation to enable the HWD system to determine a six axis pose of a head reference frame associated with the HWD system. Here, the six axis pose may be relative to the aircraft including each of: an x position, a y position, a z position, a pitch position, a roll position, and a yaw position to ensure an accurate pose of the pilot's head during head movement relative to the aircraft.

For fiducial illumination, the display bezel may also include an illuminator proximal with the bezel embedded head tracking fiducial configured for backlight illumination of the bezel embedded head tracking fiducial, the illuminator may receive power from a display power source requiring no additional wires or power sources to illuminate the fiducial.

To offer the HWD system an ability to create an accurate display, the coded feature within the bezel embedded head tracking fiducial may be combined with a spatial orientation of the constellation includes sufficient data for the HWD system to reach a desired error rate of the six axis pose.

An additional embodiment of the inventive concepts disclosed herein may include a method for presentation of a bezel embedded head tracking fiducial. The method may include embedding a bezel embedded head tracking fiducial within a bezel of a display in a cockpit onboard on aircraft, the bezel embedded head tracking fiducial including a coded data and configured for recognition by an optical tracker associated with an HWD system.

For accurate presentation to the pilot, the system may include orienting the bezel embedded head tracking fiducial in a constellation to enable the HWD system to determine a six axis pose of a head reference frame associated with the HWD system, the six axis pose relative to the aircraft and including each of: an x position, a y position, a z position, a pitch position, a roll position, and a yaw position.

To provide sufficient information to the HWD system, the method may include configuring each of the bezel embedded head tracking fiducial with information sufficient for the HWD system to determine, combined with additional ones of the bezel embedded head tracking fiducial within the constellation, the six axis pose within a desired error rate and illuminating the at least one bezel embedded head tracking fiducial with a power source of the display.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIG. 2 is a diagram of a display front view in accordance with an embodiment of the inventive concepts disclosed herein;

FIGS. 3A-3C are diagrams of a passive and active fiducial exemplary of an embodiment of the inventive concepts disclosed herein;

DETAILED DESCRIPTION OF EXEMPLARY EMBODIMENTS

Figure 1:
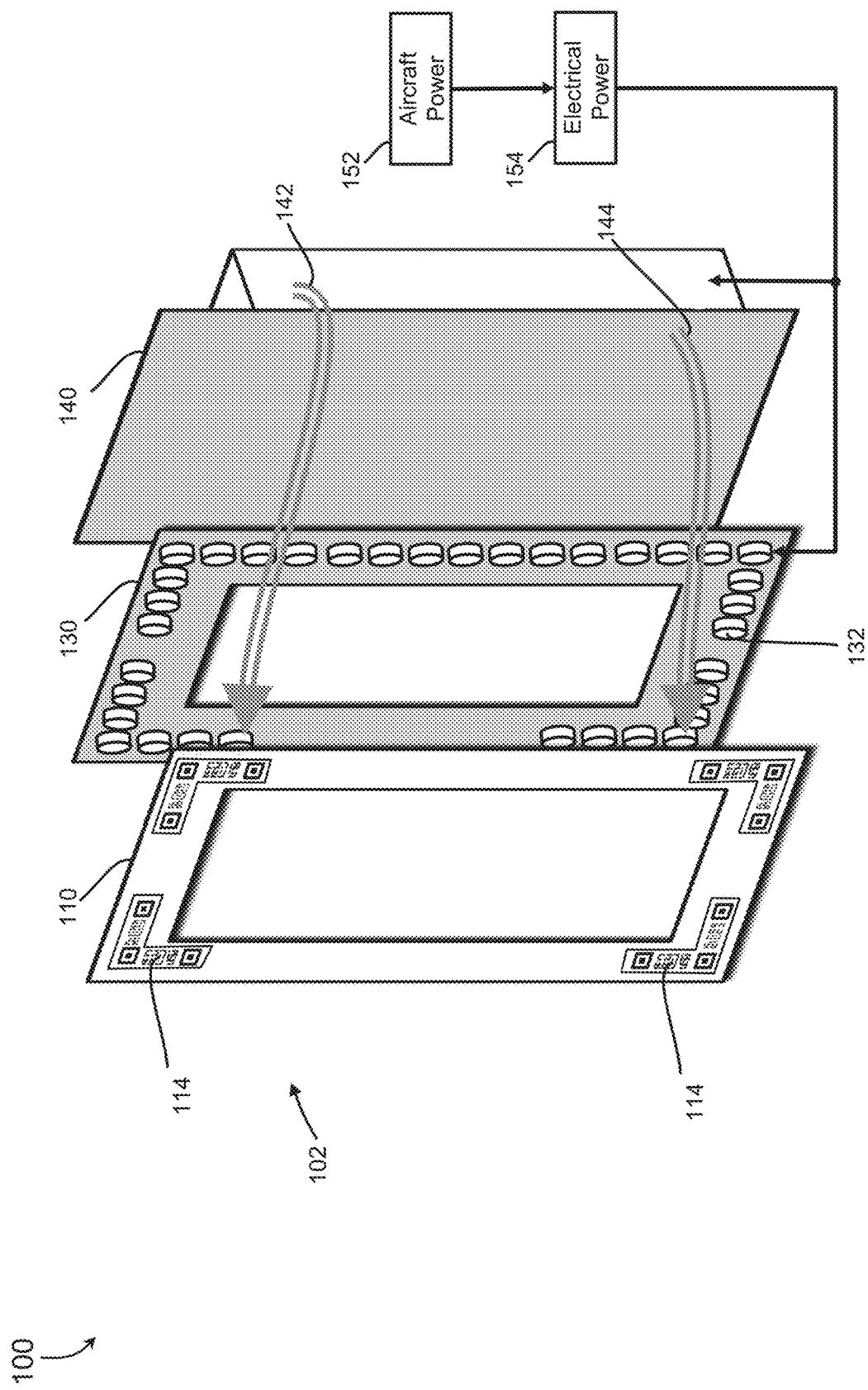
FIG. 1 is a diagram of an exploded view of a display incorporating presentation of a bezel embedded head tracking fiducial in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a device and method for presentation of bezel embedded head tracking fiducials within an aircraft cockpit incorporates two and three-dimensional fiducial markers within a bezel of a forward display. Oriented in a constellation within a constant field of view of the pilot, the fiducials are specifically configured for continuous recognition by an optical sensor associated with a head worn display (HWD). With continuous constellation recognition, the HWD identifies the bezel embedded fiducials and determines a high integrity pose solution of a head reference frame relative to the aircraft enabling the system to present a high integrity primary flight display to the pilot without requiring an additional flight display available. Using active backlit short-wave infrared (SWIR) lighting and/or passively coated with reflective material specifically tuned to the night vision systems available to the HWD sensor, the bezel embedded fiducials allow operation of the HWD systems in any illumination environment.

REFERENCE CHART

| | |
|---|---|
| 100 | Display Exploded View |
| 102 | Aircraft Display |
| 110 | Display Bezel |
| 114 | Bezel Embedded Fiducial |
| 130 | Backlight Layer |
| 132 | Backlight Illuminator |
| 140 | Display Screen |
| 142 | Light Channel |
| 244 | Display Content |
| 144 | Emissive Illumination |
| 152 | Aircraft Power |
| 154 | Display Electrical Power |
| 200 | Display View |
| 220 | Fiducial Position Marker |
| 222 | Fiducial Information |
| 300 | Backlight Fiducial View |
| 302 | Translucent Pixel |
| 304 | Opaque Pixel |
| 306 | Red Pixel |
| 308 | Green Pixel |
| 310 | Grey Pixel |
| 314 | Fiducial Passive View |
| 324 | Active Backlight Fiducial |
| 334 | Variable Frequency Fiducial |
| 400 | Cockpit Constellation |
| 402 | Forward Panel |
| 410 | Left MFD |
| 412 | Left MFD Bezel |
| 414 | Left MFD Embedded Fiducial |
| 420 | Right MFD |
| 424 | Right MFD Embedded Fiducial |
| 430 | Center MFD |
| 434 | Center MFD Embedded Fiducial |
| 440 | Control Display Navigation Unit (CDNU) |
| 444 | CDNU Embedded Fiducial |
| 450 | Head Up Display (HUD) |
| 454 | HUD Embedded Fiducial |
| 500 | HWD System |
| 510 | Controller |
| 512 | Aircraft State Data |
| 520 | Head Worn Device |
| 522 | HWD Optical Sensor |
| 530 | Pitch |
| 532 | X Axis (Pitch) |
| 540 | Roll |
| 542 | Z Axis (Roll) |
| 550 | Yaw |
| 552 | Y Axis (Yaw) |
| 600 | Method Flow |

| | |
|---|---|
| 602 | Embedding a Fiducial |
| 604 | Orienting a Constellation |
| 606 | Configuring Fiducial Information |
| 608 | Illuminating the Fiducial |

FIG. 1

Referring now to FIG. 1, a diagram of an exploded view of a display incorporating presentation of a bezel embedded head tracking fiducial in accordance with an embodiment of the inventive concepts disclosed herein is shown. In one embodiment of the inventive concepts disclosed herein, display devices disclosed herein may function to provide a spatially diverse constellation of illuminated fiducial markers embedded within an aircraft display bezel. The fiducial makers may provide sufficient number and data available to an HWD and HMD (hereinafter commonly referred to as HWD) system to determine a high integrity six axis pose of a head reference frame enabling the HWD system to present a high integrity primary flight display to the pilot without requiring an additional flight display available.

In one embodiment of the inventive concepts disclosed herein, the an error overbounding may be provided in the approach described within U.S. patent application Ser. No. 16/263,388 entitled "High-Integrity Optical Pose Estimation Using Coded Features" incorporated herein by using fiducial markers that encode a sufficient number of bits with some minimum Hamming distance (or similar metric) between markers. For example, to achieve a desired low error rate for marker correspondence with a constellation of a specific number of markers, each marker may encode a specific amount of data to achieve the desired low error rate.

Generally, a display exploded view 100 of a presentation of a bezel embedded head tracking fiducial may include an aircraft display 102 within an aircraft cockpit onboard an aircraft. The aircraft display 102 may include a display screen 140, a backlight layer 130, and the bezel 110. Within the bezel 110 a plurality of bezel embedded head tracking fiducials 114 may enable the HWD system to sense and use the fiducials 114 to determine the high integrity six axis pose of a head reference frame.

Backlight Illuminator

In one embodiment of the inventive concepts disclosed herein, the backlight layer 130 may be configured with a plurality of backlight illuminators 132 configured to actively backlight each of the associated proximal plurality of bezel embedded head tracking fiducials 114. To power the backlight illuminators 132 within the backlight layer 130, an aircraft power 152 may supply the display screen 140 and a display electrical power 154 may also be routed to each of the backlight illuminators 132. In this manner, the backlight layer 130 does not require a separate power source and may receive power directly from the display electrical power 154. Each of the backlight illuminators 132 may be positioned in a specific location (e.g., a corner) as well as surrounding a whole of the bezel 110 perimeter.

In embodiments, the backlight layer 130 may be fitted with illuminators 132 proximal with the bezel and capable of emitting light within a plurality of wavelengths at a plurality of selectable illumination levels. In some flight environments, a visible wavelength may be appropriate in, for example, a low threat environment during night operations. Here, variable colors of backlight may include an exemplary pilot selectable red, blue, green, white, etc. may function to adequately illuminate the fiducial 114 from behind to enable tracking by the HWD system optical sensor. In some embodiments, the backlight illuminator 132 is pilot selectable to a plurality of illumination levels and desired settings including an on position, an off position, and an automatic position based on a setting of the aircraft display 102.

In another flight environment, a backlit fiducial 114 may be appropriately lighted with a short-wave infrared (SWIR) backlight illuminator 132. Here, the SWIR illuminator may provide a specific wavelength compatible with a plurality of night vision imaging systems (NVIS) in use by the HWD (e.g., class A, B, C). In some embodiments, the SWIR backlight illuminators 132 may be specifically tuned to a desired frequency outside the NVIS reception capability. The backlight may be separate from a wavelength detectable by the NVIS associated with the HWD system. In another embodiment, the SWIR backlight illuminator 132 is in an always on position enabling the HWD sensor to recognize the fiducials 114 whether the NVIS system is in use or not.

In additional embodiments, the backlight illumination may come from a portion of illumination from the display 140 itself requiring no additional illuminators 132 added to the display. A light channel 142 or similar device may be added to the bezel 110 to harness an available light source enabling emissive active illumination from the display 140 screen (e.g., LCD backlight) to backlight the fiducials 114. Further, as the backlight from the display 140 may be in the visible spectrum, the bezel embedded fiducials 114 may be configured of specially designed material to block the visible spectrum and produce a specific wavelength during certain operations.

Further, an emissive display may include border pixels available to produce a backlight emissive illumination 144 of the bezel embedded fiducials 114. The display 140 may be enlarged to accommodate the additional pixel in addition to slightly enlarging the bezel 110 to accommodate the bezel embedded fiducials 114 backlight by the display 140.

Embedded Fiducials

In one embodiment of the inventive concepts disclosed herein, the bezel embedded head tracking fiducials 114 may be embedded within the bezel 110 and include a coded feature for recognition by an optical tracker associated with the HWD system. When combined with additional bezel embedded head tracking fiducials 114, a constellation of bezel embedded head tracking fiducials 114 in a priori display locations or locations unknown to the HWD system may enable the HWD system to determine a six axis pose of the head reference frame associated with the HWD system. Further, with the bezel embedded head tracking fiducials 114 in a priori display locations, no additional information may be required for the HWD to realize the location of the expected fiducials 114. For example, no additional test flight or mapping information may be required since the constellation location and displays are known to the HWD system.

In one embodiment of the inventive concepts disclosed herein, the bezel embedded head tracking fiducials 114 may be a three-dimensional physical cavity within the bezel (e.g., machined in to the bezel) to allow the illumination to pass through the bezel 110. Here, the coded data feature may be machined within the bezel as, for example, a series of small holes and opaque portions within the bezel. In other embodiments, the bezel embedded head tracking fiducials 114 may include a translucent material embedded within the bezel enabling throughput of the illumination. In additional embodiments, the bezel embedded head tracking fiducials 114 may include a transparent material embedded within the bezel to allow a greater amount of the illumination through the bezel 110. Contemplated herein, each bezel 110 may be entirely translucent/transparent with the bezel embedded head tracking fiducials 114 incorporated therein.

One advantage of incorporating the bezel embedded head tracking fiducials 114 may include a cost-effective method for integrating and presenting head tracking fiducials without using additional space or clutter within the cockpit. Each aircraft display 102 may be inherently located within a field of view (FOV) of the pilot and therefore within a FOV of the optical sensor of the HWD system. Since the bezels 110 may be previously included within a zero-fuel weight of the aircraft, no additional weight may be realized with an addition of the bezel embedded head tracking fiducials 114.

FIG. 2

Referring now to FIG. 2, a diagram of a display front view in accordance with an embodiment of the inventive concepts disclosed herein is shown. An aircraft display view 200 may include the bezel 110 with the bezel embedded head tracking fiducials 114 located here in each corner of the aircraft display 102. A display content 244 may present traditional information to the pilot via the visual display.

In some embodiments, the bezel embedded head tracking fiducials 114 may include a fiducial position marker 220 functional to enable the optical sensor to location the fiducial as well as a fiducial information 222 containing the coded feature and data usable by the HWD system.

FIG. 3A-C

Referring now to FIGS. 3A-3C, a diagrams of a passive and active fiducial exemplary of an embodiment of the inventive concepts disclosed herein is shown. A backlight fiducial view 300 may include a fiducial passive view 314, an active backlight fiducial 324, and a colored fiducial 334. In some embodiments, each of the plurality of bezel embedded head tracking fiducials 114 may be actively illuminated by the backlight layer 130 as well as passively conspicuous to an optical sensor associated with the HWD system.

FIG. 3A may detail the passive view 314 to include those pixels coated with material reflective to ambient cockpit light at a specific wavelength outside that of the NVIS onboard the aircraft to ensure the HWD sensor and a NVIS sensor are wavelength separated. In addition to allowing a pass through of the illumination provided by the backlight layer 130, the bezel embedded head tracking fiducials 114 may include a two-dimensional pattern of a material configured for reflection of a wavelength separate from the NVIS associated with the HWD system. For example, one fiducial 114 may include the opaque pixel 302 coated with a reflective material while an adjacent pixel 304 may be translucent. Here, the HWD system may recognize the opaque 302 and translucent 304 pixels for the data they present while being illuminated with ambient cockpit light.

FIG. 3B may detail an exemplary active backlight fiducial 324 enabling the illumination from the backlight layer 130 to pass through the bezel 110. Here, an exemplary translucent bezel may include an opaque pixel 302 oriented to be recognized by the optical tracker associated with the HWD system. Here the opaque pixel 302 may function to block the backlit illumination. Also, a translucent pixel 304 may function to transmit the backlit illumination from the illuminators 132 to the HWD system optical sensor. Conversely, in some embodiments, each pixel may be configured with a level of translucence enabling the optical sensor to distinguish one pixel from another.

FIG. 3C may detail a colored fiducial 334 including a variable translucence of an individual pixel to move the data available to the fiducial from binary to a greater number (e.g., base 3 or base 4) to encode additional data within a smaller area. Each individually colored pixel may offer a greater amount of data than would a binary pixel (e.g., black and white) colored within the same space. A red pixel 306, a green pixel 308, and a grey pixel 310, (including additional available luminance and wavelength pixels) may offer additional coded features to the bezel embedded head tracking fiducials 114 by functioning to block light outside of the desired wavelength. In this manner, the colored fiducial 334 may offer approximately twice the coded feature data available to the HWD system of a smaller fiducial 114 may offer information sufficient to determine the six axis pose.

For example, with a binary fiducial, to capture 16 unique codes, a 4-pixel binary marker 314 324 may be required. However, if each pixel may represent an exemplary 4 different values (e.g. black white red green), a 2-pixel colored marker within the variable frequency fiducial 334 may present a similar 16 unique codes to the HMD system.

In an exemplary active fiducial 324 changing a translucence property of the individual pixel to a shade of grey may present the desired information. In the passive fiducial 314 changing a reflective material to reflect a specific wavelength may present the desired coded feature.

FIG. 4

Figure 4:
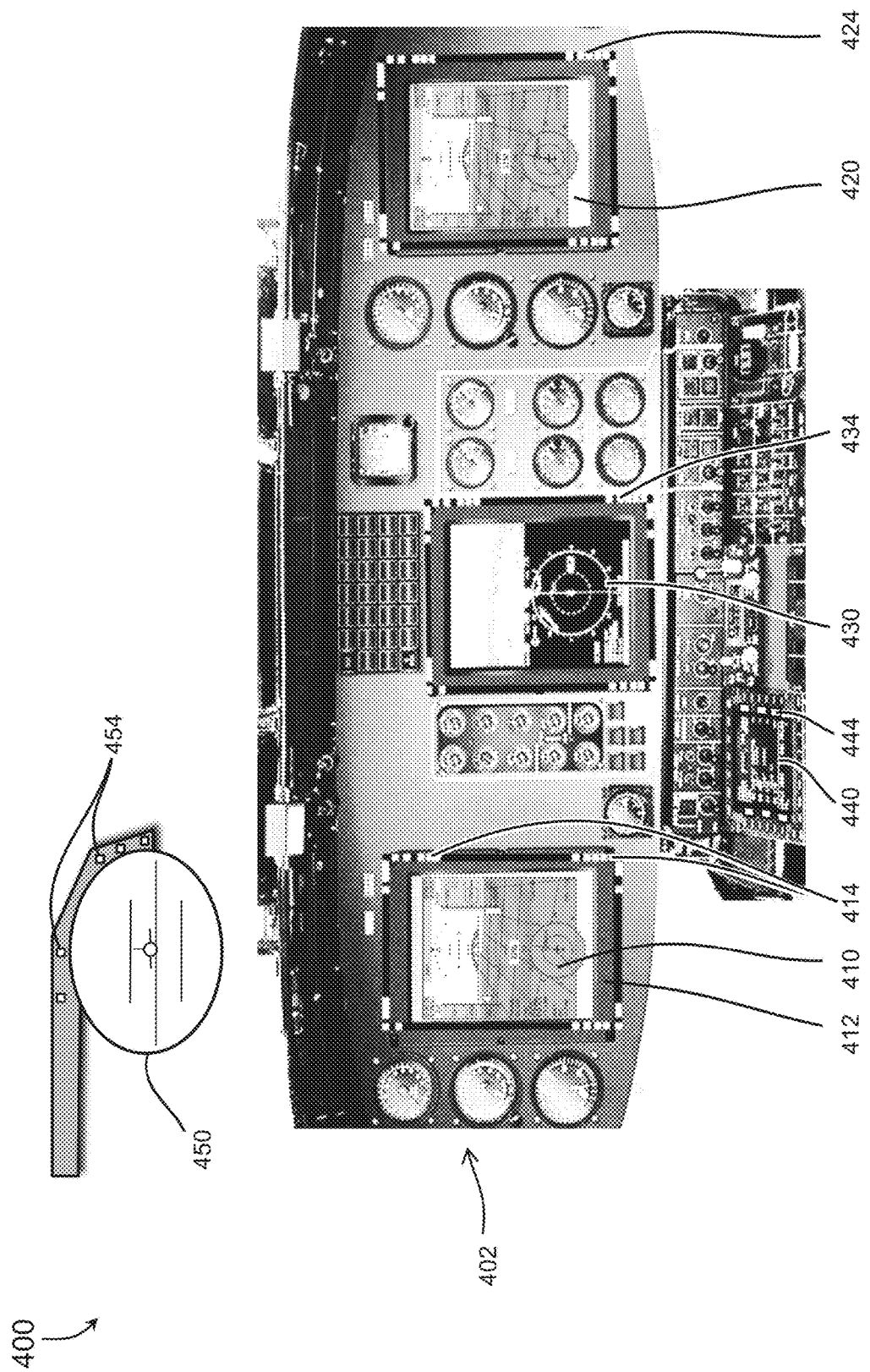
FIG. 4 is a diagram of a cockpit constellation exemplary of one embodiment of the inventive concepts disclosed herein.

Referring now to FIG. 4, a diagram of a cockpit constellation exemplary of one embodiment of the inventive concepts disclosed herein is shown. A cockpit constellation 400 may include a plurality of the bezel embedded head tracking fiducials 114 oriented in a priori locations easily recognizable by the HWD optical sensor. Onboard displays may include a multi-function display (MFD), a head up display (HUD), a flight management system (FMS) display, and a control display navigation unit (CDNU) onboard the aircraft in which the bezel embedded head tracking fiducials 114 may be employed.

A forward panel 402 may include a left MFD 410, a left MFD bezel 412, and a left MFD embedded fiducial 414. The forward panel 402 may further include a right MFD 420, a right MFD embedded fiducial 424, a center MFD 430, and a center MFD embedded fiducial 434. In addition to the forward panel 402, other locations within a FOV of the pilot may include a CDNU 440, a CDNU embedded fiducial 444, a HUD 450, and a HUD embedded fiducial 454.

Individually, each bezel embedded head tracking fiducial 114 may present a limited amount of information within the coded feature available to the HWD system. However, oriented within the constellation, a plurality of the bezel embedded head tracking fiducials 114 may present sufficient data to the HWD system to reach a desired error rate of the six axis pose. In embodiments, the desired error rate may enable the HWD system to determine, in addition with inertial tracking data, a high integrity six axis pose solution.

FIG. 5

Figure 5:
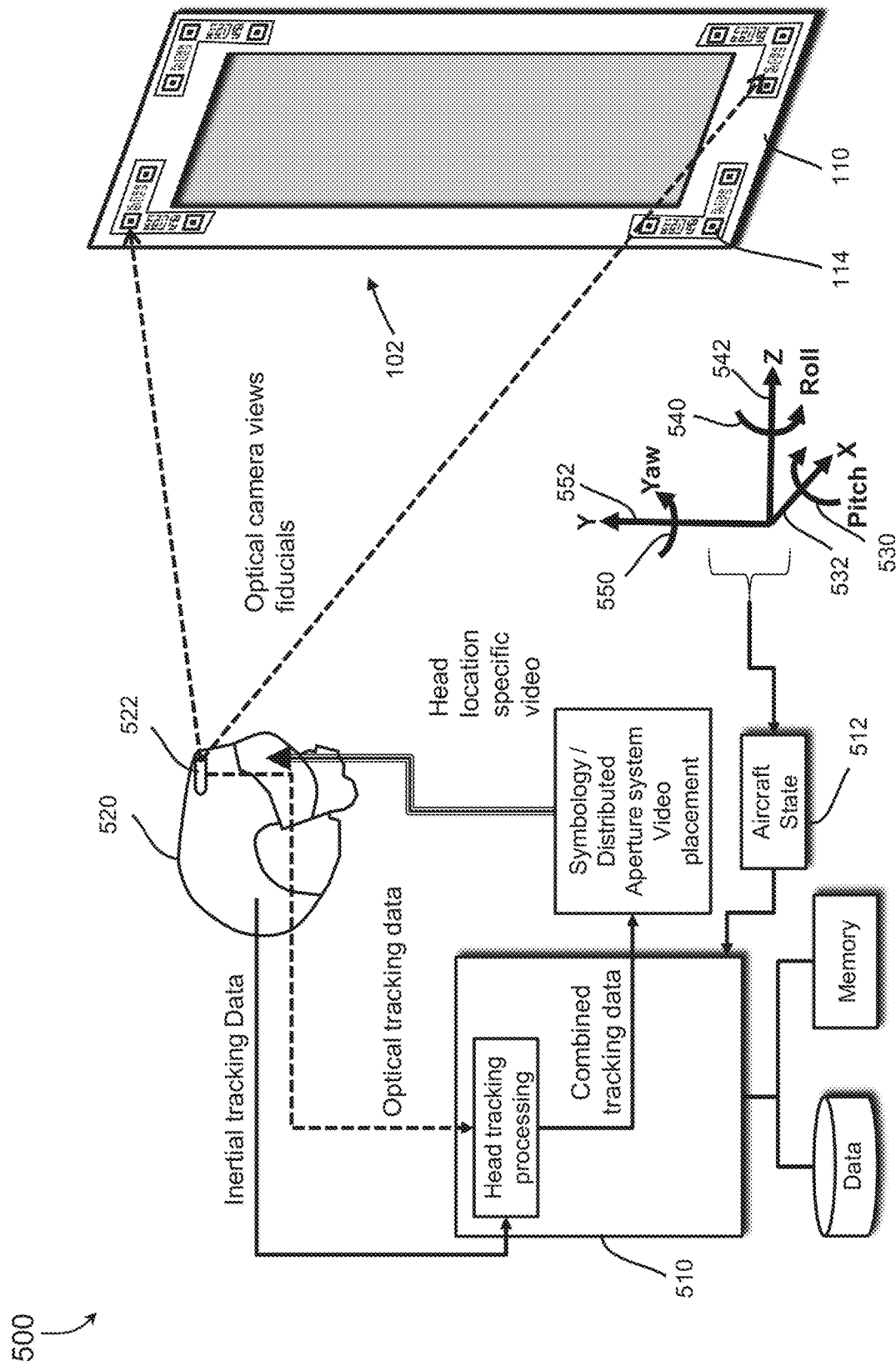
FIG. 5 is a diagram of an HWD/HMD system in accordance with one embodiment of the inventive concepts disclosed herein.

Referring now to FIG. 5, a diagram of an HWD/HMD system in accordance with one embodiment of the inventive concepts disclosed herein is shown. A view of the HWD system 500 may include a head worn device 520 (e.g., a helmet) and an HWD optical sensor 522. A controller 510 may function to receive inertial tracking data as well as optical tracking data, perform processing of combined tracking data, reference an internal data and memory, and display symbology/distributed aperture video within the head worn device 520.

In one embodiment of the inventive concepts disclosed herein, the controller 510 may determine head location specific video based on a determination of the head reference frame. Here the head reference frame may include the six axis pose relative to an aircraft state data 512 including a pitch 530 and X axis (pitch) 532 positions, a roll 540 and Z axis (roll) 542 positions, and a yaw 550 and Y axis (yaw) 552 positions.

In one embodiment, the bezel embedded head tracking fiducials 114 may be oriented within the constellation within the aircraft cockpit so that each fiducial is within a field of view of the optical sensor 522 with the HWD 520 oriented toward the display 140.

Conversely, in an additional embodiment of the inventive concepts disclosed herein, the bezel embedded head tracking fiducials 114 may be in locations previously unknown to the HWD system where the HWD sensor 522 may sense the fiducials 114, map the constellation of fiducials, and determine the six axis pose based on the sensed constellation and reception of the aircraft state data 512.

In one embodiment of the inventive concepts disclosed herein, the constellation may employ a number and spatial orientation of the bezel embedded head tracking fiducial 114 with coded data sufficient to achieve the desired error rate. For example, with great accuracy, the bezel embedded head tracking fiducials 114 may enable the HWD system to present, using optical tracking data as well as inertial tracking data, a high integrity primary flight display to the pilot without requiring an additional flight display available.

FIG. 6

Figure 6:
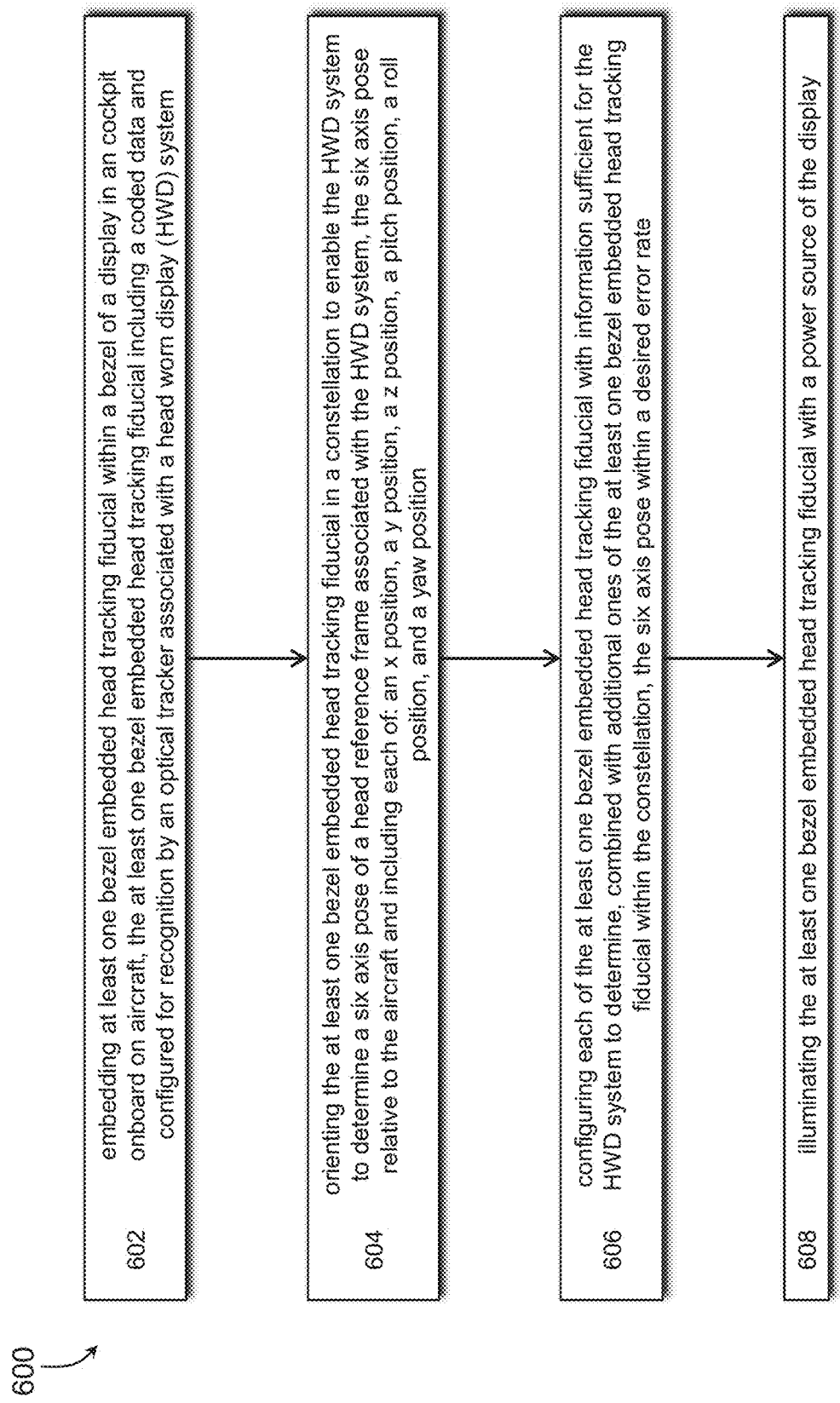
FIG. 6 is a diagram of an exemplary method for presentation of a bezel embedded head tracking fiducial in accordance with one embodiment of the inventive concepts disclosed herein.

Referring now to FIG. 6, a diagram of an exemplary method for presentation of a bezel embedded head tracking fiducial in accordance with one embodiment of the inventive concepts disclosed herein is shown. A method flow 600 for presentation of a bezel embedded head tracking fiducial may include, at a step 602, embedding at least one bezel embedded head tracking fiducial within a bezel of a display in an cockpit onboard on aircraft, the at least one bezel embedded head tracking fiducial including a coded data and configured for recognition by an optical tracker associated with a head worn display (HWD) system.

A step 604 may include orienting the at least one bezel embedded head tracking fiducial in a constellation to enable the HWD system to determine a six axis pose of a head reference frame associated with the HWD system, the six axis pose relative to the aircraft and including each of: an x position, a y position, a z position, a pitch position, a roll position, and a yaw position.

For including desired data within the fiducials, a step 606 may include configuring each of the at least one bezel embedded head tracking fiducial with information sufficient for the HWD system to determine, combined with additional ones of the at least one bezel embedded head tracking fiducial within the constellation, the six axis pose within a desired error rate while a step 608 may include illuminating the at least one bezel embedded head tracking fiducial with a power source of the display.

In one embodiment of the inventive concepts disclosed herein, embedding the bezel embedded head tracking fiducial within a bezel of a display may further comprise opening a physical cavity within the bezel, forming the bezel of a translucent material, and machining a three-dimensional cavity within the bezel to create a contrast fiducial within the bezel.

CONCLUSION

As will be appreciated from the above description, embodiments of the inventive concepts disclosed herein may provide a novel solution to leverage existing space surrounding a cockpit display to enable accurate head tracking relative to the aircraft without the integration complexity added by requiring separate fiducial markers.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A device for presentation of at least one bezel embedded head tracking fiducial, comprising:

at least one display within an aircraft cockpit onboard an aircraft, the at least one display including a bezel surrounding the at least one display;

the at least one bezel embedded head tracking fiducial embedded within the bezel, the at least one bezel embedded head tracking fiducial including a coded feature and configured for recognition by an optical tracker associated with a head worn display (HWD) system;

the at least one bezel embedded head tracking fiducial oriented in a constellation to enable the HWD system to determine a six axis pose of a head reference frame associated with the HWD system, the six axis pose relative to the aircraft and including each of: an x position, a y position, a z position, a pitch position, a roll position, and a yaw position;

the bezel including at least one illuminator proximal with the at least one bezel embedded head tracking fiducial and configured for a backlight illumination of the at least one bezel embedded head tracking fiducial, the at least one illuminator powered by a display power source, the at least one illuminator is pilot selectable to one of: an on position, an off position, and an automatic position based on a setting of the at least one display;

wherein the coded feature within the at least one bezel embedded head tracking fiducial combined with a spatial orientation of the constellation of the at least one bezel embedded head tracking fiducial includes sufficient data for the HWD system to reach a desired error rate of the six axis pose.

2. The presentation of a bezel embedded head tracking fiducial of claim 1, wherein the at least one bezel embedded head tracking fiducial embedded within the bezel is one of: actively illuminated by one of: the at least one illuminator and a portion of illumination from the at least one display, and passively detectable by the optical tracker associated with the HWD system.

3. The presentation of a bezel embedded head tracking fiducial of claim 2, wherein the passively detectable at least one bezel embedded head tracking fiducial further comprises a two-dimensional pattern of a material configured for reflection of a wavelength separate from a wavelength detectable by a night vision imaging system (NVIS) associated with the HWD system.

4. The presentation of a bezel embedded head tracking fiducial of claim 1, wherein the at least one illuminator proximal with the bezel further comprises one of a short wave infrared (SWIR) illuminator and a visible wavelength illuminator.

5. The presentation of a bezel embedded head tracking fiducial of claim 1, wherein the at least one display within the aircraft cockpit further comprises one of: a multi-function display (MFD), a head up display (HUD), a flight management system (FMS) display, and a control display navigation unit (CDNU) onboard the aircraft.

6. The presentation of a bezel embedded head tracking fiducial of claim 1, wherein the constellation of the at least one bezel embedded head tracking fiducial within the aircraft cockpit is within a forward field of view of a pilot.

7. The presentation of a bezel embedded head tracking fiducial of claim 1, wherein the at least one bezel embedded head tracking fiducial embedded within the bezel is one of: a three-dimensional cavity within the bezel, a translucent material embedded within the bezel, and a transparent material embedded within the bezel.

8. The presentation of a bezel embedded head tracking fiducial of claim 1, wherein the bezel is translucent and the at least one bezel embedded head tracking fiducial embedded within the bezel includes at least one opaque pixel oriented to be recognized by the optical tracker associated with the HWD system.

9. The presentation of a bezel embedded head tracking fiducial of claim 7, wherein the translucent material is colored to pass a specific wavelength wherein each pixel of the bezel embedded head tracking fiducial is individually colored to present an additional data of the coded feature.

10. A method for presentation of at least one bezel embedded head tracking fiducial, comprising:
embedding the at least one bezel embedded head tracking fiducial within a bezel of a display in a cockpit onboard on aircraft, the at least one bezel embedded head tracking fiducial including a coded data and configured for recognition by an optical tracker associated with a head worn display (HWD) system;
orienting the at least one bezel embedded head tracking fiducial in a constellation to enable the HWD system to determine a six axis pose of a head reference frame associated with the HWD system, the six axis pose relative to the aircraft and including each of: an x position, a y position, a z position, a pitch position, a roll position, and a yaw position;
configuring each of the at least one bezel embedded head tracking fiducial with information sufficient for the HWD system to determine, combined with additional ones of the at least one bezel embedded head tracking fiducial within the constellation, the six axis pose within a desired error rate; and
illuminating the at least one bezel embedded head tracking fiducial with a power source of the display via a pilot selectable backlight illumination to one of: an on position, an off position, and an automatic position based on a setting of the at least one display.

11. The method for presentation of a bezel embedded head tracking fiducial of claim 10, wherein illuminating the at least one bezel embedded head tracking fiducial further comprises actively illuminating the at least one bezel embedded head tracking fiducial with a backlight SWIR illuminator.

12. The method for presentation of a bezel embedded head tracking fiducial of claim 10, wherein configuring each of the at least one bezel embedded head tracking fiducial with information further includes coloring at least one pixel of the bezel embedded head tracking fiducial with a translucent material to pass a specific wavelength wherein each pixel of the bezel embedded head tracking fiducial is individually colored to present a coded feature.

13. The method for presentation of a bezel embedded head tracking fiducial of claim 10, wherein orienting the at least one bezel embedded head tracking fiducial in the constellation further comprises orienting a specific number and spatial orientation of the at least one bezel embedded head tracking fiducial in known display locations within an aircraft cockpit to enable the HWD system to achieve the desired error rate enabling display of a high integrity primary flight display to a pilot.

14. The method for presentation of a bezel embedded head tracking fiducial of claim 10, wherein embedding at least one bezel embedded head tracking fiducial within a bezel of a display further comprises one of: opening a physical cavity within the bezel, forming the bezel of a translucent material, and machining a three dimensional cavity within the bezel to create a contrast fiducial within the bezel.

* * * * *